UNITED STATES PATENT OFFICE.

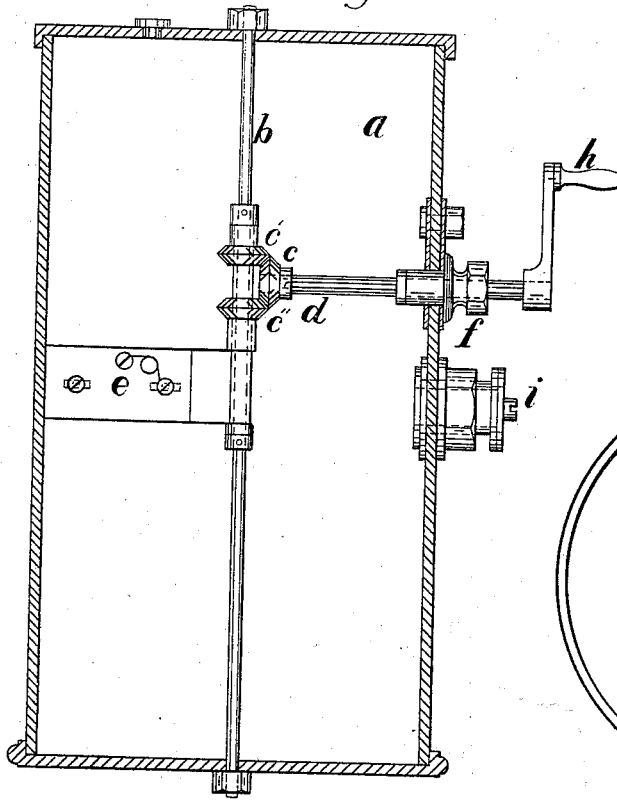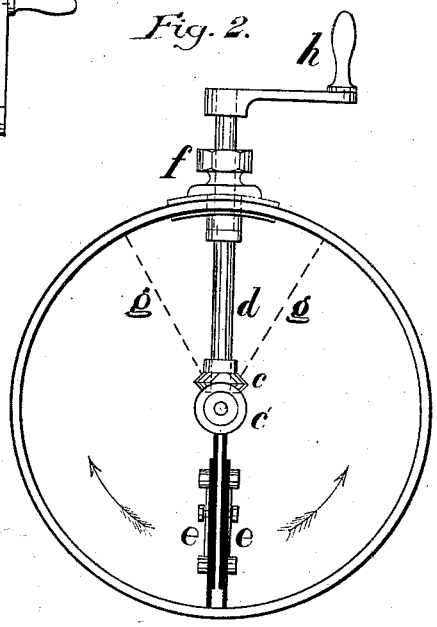

NATHANIEL CALDWELL, OF CINCINNATI, OHIO.

IMPROVEMENT IN LARD-TANK SKIMMERS.

Specification forming part of Letters Patent No. 168,610, dated October 11, 1875; application filed May 31, 1875.

*To all whom it may concern:*

Be it known that I, NATHANIEL CALDWELL, of the city of Cincinnati, Ohio, have invented an Improved Lard-Tank Skimmer, of which the following is a specification:

The object of my invention is the skimming the last portion of lard in lard-rendering tanks, that will not run off of itself when it is in its purest state and of the most value, and at the same time with the least amount of waste, and with the least outlay of labor; and consists of a device which is simple in construction and effective in its operations.

In the accompanying drawings illustrating my invention, in which like letters represent like parts, Figure 1 is a side elevation, showing the tank $a$ in section, with my improvements in working position.

$a$ is the shell of the tank; $b$, the center bolt or stay-rod by which the two heads are stiffened, and is common to all lard-tanks and tanks of this kind. $c\, c'\, c''$ are the gear-wheels, which operate the skimmers $e\, e$ by means of the shaft $d$ and crank $h$. $f$ is the stuffing-box, through which the shaft $d$ runs and is held in place. $i$ is what is called the lard-cock, through which the melted lard is drawn off from the tank after the steaming process is done.

Fig. 2 is a plan view of Fig. 1, with the upper head and lard-cock $i$ removed, showing the manner of construction and operation of the skimmers $e\, e$. (Shown in heavy black lines, with the sliding blades on the outer sides of the blade fastened to the wheels $c'\, c''$.)

The object of the sliding blade is to at all times have the ends of the sliding blades in contact with the sides of the tank, so that they will accommodate themselves to any uneven surface of the tank's sides, they moving endwise by a spring or similar device, on studs or in grooves, so as to be held in place and move freely, thus making a partly-tight joint, so as not to allow the lard to pass between the end of the skimmer's blade and the side of the tank as freely as it would if the skimmer-blade were all in one piece from wheels $c'\, c''$ out to shell of tank $a$, unless the tank were perfectly true. The skimmers are operated by having the upper wheel $c'$ bored out large enough to allow a sleeve to pass down to the under side of wheel $c''$, at the same time to inclose the upright bolt $b$, around which it revolves. One blade of the skimmer is fastened to this sleeve, and is driven by the upper wheel, which is fastened to it, while the other skimmer-blade is fastened to the lower wheel $c''$, thus bringing the two skimmer-blades below the gear-wheels $c'\, c''$; or the blades $e\, e$ may be attached directly to wheels $c'\, c''$ without the use of the sleeves, still operating the same.

The construction and operation of my improved skimmer are as follows: On the center stay-bolt $b$ I place the two gear-wheels $c'\, c''$, and the sleeve, which carries one of the skimmer-blades, which fit loosely, so as to turn freely on it. The sleeve and wheels are held in place by set-collars, so as to prevent them from lifting or dropping out of gear with the wheel on the end of shaft $d$, which gives them motion by turning the crank $h$. On inside of the tank the shaft $d$ has a collar working against the end of the stuffing-box $f$, so as to prevent it from being forced back and carry the wheel $c$ out of gear with the two wheels on the bolt $b$. The two wheels $c'\, c''$ on the bolt $b$ will revolve in different directions, by reason of one being above and the other below the center of shaft $d$. By turning the crank $h$ the shaft $d$ and wheel $c$ will revolve and carry with it the two wheels $c'\, c''$ and skimmer-blades $e\, e$ in opposite directions from their positions of rest, which is in line with shaft $d$, or nearly so, around toward the lard-cock $i$, in the direction indicated by the arrows, and carry the lard before them, and keep it confined between the blades thus until the blades have arrived at $g\, g$, (shown in dotted lines,) where it is drawn off. If the lard is below the cock $i$, water is let into tank $a$ to raise the lard up to cock $i$, and if above it water is drawn off from the tank $a$ to bring the lard down to the cock $i$. The skimming operation is done by a slow movement of the crank $h$, so as to give the water that may be collected up with the lard time to settle below it. The operation of skimming and admission and drawing off of water into and from the tank may be carried on until very little, if any, lard remains in the tank.

By the use of the above skimmer I am enabled to take off the lard while the waste material and other impurities are settled below the surface of the lard, thus saving a large per cent. of lard over the old way of first drawing off all the lard that will run off of itself, and then letting all of the waste material, water, and what lard still remains in the tank into what is called the slush-tub, where it all mixes up together, and has to have steam put to it again to separate the lard, and bring it to the top to be skimmed off by hand. This operation reduces the quantity of the lard, and makes a great waste. This I am enabled to prevent by the use of skimmers for the following reasons: First, I take off the lard while it is in the tank in its purest state and of the best quality, as well as of the most value. Secondly, I am enabled to draw off the lard in a much shorter time than it can be done without the skimmer, thus saving a large amount of time over the old way, as well as labor.

I do not wish to be understood as confining myself in using my improved skimmer to lard-rendering tanks only, as it may be applied to various kinds of tanks for various purposes. So also may the mechanical construction be varied without departing from my invention.

I claim as my invention—

1. The above-described skimmer, consisting of the wheels $c\ c'\ c''$, shaft $d$, bolt $b$, blades $e\ e$, and crank $h$, all combined and arranged substantially as and for the purpose set forth.

2. The combination of the tank $a$, having an outlet, $i$, and the shaft $d$, the bolt $b$, wheels $c\ c'\ c''$, and blades $e\ e$, as and for the purposes described.

NATHANIEL CALDWELL.

Attest:
 SAM. B. COOKE,
 S. H. WHITMORE.